United States Patent [19]

Hazama et al.

[11] Patent Number: 5,409,175
[45] Date of Patent: Apr. 25, 1995

[54] PHOTOGRAPHIC FILM PACKAGE

[75] Inventors: Kiyoaki Hazama; Kazuhiro Nakanishi; Takemi Miyazaki; Yoshio Kakuta; Noriyuki Kaedeoka; Ying J. Min, all of Hachioji; Osamu Shibazaki, Hino; Masaru Iwagaki, Hino; Kazumasa Matsumoto, Hino, all of Japan

[73] Assignee: Konica Corporation, Tokyo, Japan

[21] Appl. No.: 106,817

[22] Filed: Aug. 16, 1993

[30] Foreign Application Priority Data

Aug. 24, 1992 [JP] Japan ................................ 4-247219

[51] Int. Cl.⁶ .............................................. G03B 17/26
[52] U.S. Cl. .................................................... 242/348

[58] Field of Search .................. 242/348, 348.1, 348.2, 242/348.3, 348.4; 354/275

[56] References Cited

U.S. PATENT DOCUMENTS 3,690,582 9/1972 Duvall ............................. 242/348.2
5,048,770 9/1991 Baxter et al. ..................... 242/348.4

Primary Examiner—John M. Jillions
Attorney, Agent, or Firm—Frishauf, Holtz, Goodman & Woodward

[57] ABSTRACT

A photographic roll film cartridge in which a roll film is stored in an initial packaged condition before being used for photographing. In the initial packaged condition, the leading edge portion of the roll film protrudes out of the cartridge by a length of 10 mm to 25 mm.

8 Claims, 9 Drawing Sheets 7  8

PHOTOGRAPHIC FILM PACKAGE

BACKGROUND OF THE INVENTION

The present invention relates to a photographic film package in which the photographic film is light-tightly accommodated in a cartridge.

A 35 mm photographic roll film, which is widely used now, is accommodated in a light tight cartridge. The roll film is a long size film in which transparent holes, which are called perforations, are continuously provided on its both sides. A base end of the film is fixed on a spool shaft provided in the cartridge, and the film is wound around the shaft. A leading edge portion of the film is drawn out of the cartridge through a slit to which light tight fiber, which is commonly called teremp, is provided.

In the 35 mm photographic roll film, as widely known, there is provided a leading edge portion of the film, a half of the width of which is cut and formed into a long strip, which is commonly called a tongue. The leading edge portion is drawn out outside through the slit of the cartridge, and is engaged with a winding shaft of a camera.

An area of the leading edge portion of the 35 mm photographic roll film which is put on the market now is about 2023 mm$^2$.

A film package has been disclosed in Japanese Patent Publication Open to Public Inspection No. 306,844/1989, in which: the leading edge portion of the film is not kept under the condition that it has been drawn out from the slit of the cartridge as seen in the 35 mm photographic roll film which is put on the market now; all the film is accommodated in the cartridge; and the leading edge portion of the film is pushed out from the slit of the cartridge when a shaft of the cartridge is rotated.

Further, various kinds of proposals are widely known with respect to methods of use of the film, in which the film is used not only for image photographing but also for a recording medium in which many kinds of photographing information is optically or magnetically recorded. However, all these proposals are concerning to the method in which areas not affecting a frame image, such as both end portions of the film, are used. Recently, in contrast to this, a method is proposed in PCT Patent Application WO90/04205 or the like, in which: transparent, organic magnetic material is coated on a film base; and a large capacity of various kinds of information concerning the image information such as the photographic information are recorded in the film in addition to the photographic image information.

When the 35 mm roll film which is put on the market now is loaded in a camera, it is necessary for a user to stretch a curled leading edge portion of the film. It is very troublesome, and inferior film winding caused by erroneous film loading occurs.

When a film package, in which all the film is accommodated in the cartridge, is used, the foregoing erroneous film loading can be protected. However, the structure of the cartridge becomes complicated. Further, when the cartridge is not accurately produced, film thrusting is not conducted smoothly by rotation of the spool shaft, so that film winding may jam. Further, since the leading edge portion of the film does not appear outside the cartridge, it can not be judged whether the film has been used or the film is not used, by the leading edge portion of the film. Accordingly, it is necessary to provide a special means for the foregoing judgement, which is disadvantageous.

On the other hand, when the entire surface or a portion of the film base is coated with magnetic material, for example, transparent magnetic material, the film is extremely curled in its longitudinal direction. In the case of the film cassette in which the leading edge portion of the film is protruded from the slit of the cartridge, the leading edge portion of the film is excessively curled in its drawn-out direction (the longitudinal direction of the film), so that film loading into the camera is difficult, which is disadvantageous. Further, the film is excessively curled also in the lateral direction, which is also disadvantageous.

SUMMARY OF THE INVENTION

As it is clear from the foregoing, the main object of the present invention is to provide a cassette for a photographic film, by which the film can be easily and surely loaded in a camera, and the structure of which is simple. Further, another object of the present invention is to improve the roll film package in which the entire surface or a portion of a film base is coated with (transparent) magnetic material so that it can be easily loaded in the camera. Further, another object of the present invention is to improve the shape and the length of a leading edge portion of the film for resource saving.

In order to accomplish the foregoing objects, the photographic roll film package according to the present invention is structured as follows. In the photographic film package in which a leading edge of the photographic film is protruded from a slit of a cartridge in which the photographic film is light-tightly accommodated, the length of the leading edge of the photographic film protruded from the slit is 10 to 25 mm. A preferable embodiment of the film package according to the present invention is structured as follows. The leading edge of the photographic film has the shape in which both side end portions of the leading edge are protruded with respect to the central portion of the leading edge. An area of the leading edge portion of the film protruded from the slit is 350 to 900 mm$^2$. A magnetic recording layer is provided on the photographic film. Perforations are formed on at least one side end portion of the photographic film. The leading edge portion protruded from the slit of the photographic film package has at least two perforations. A tapered portion is provided on at least one of side end portions of the leading edge portion. The width of the photographic film is 35 mm.

DETAILED DESCRIPTION OF THE PREFERRED EMBODIMENT

Next, referring to the attached drawings, the present invention will be further explained in detail.

Figure 1:
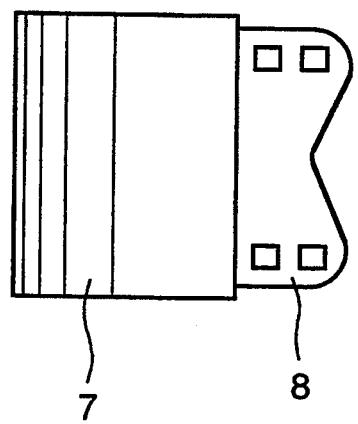
FIG. 1 is a plan view showing an example of the present invention.

FIG. 1 shows an example of the present invention. A film 8 according to the present invention is light-tightly accommodated in a cartridge 7 having a slit-opening, and a predetermined length of a leading edge of the film is protruded from the slit-opening. As shown in the drawing, the leading edge portion of the film is formed under the condition that the central portion of the film is cut out in V-shape or U-shape with respect to both side end portions. The length protruded from the slit-opening is preferably 10 to 25 mm from the leading edge portion of the film to the slit-opening, and more preferably 10 to 21 mm because the film cartridge can be easily loaded in a camera.

Figure 2A:
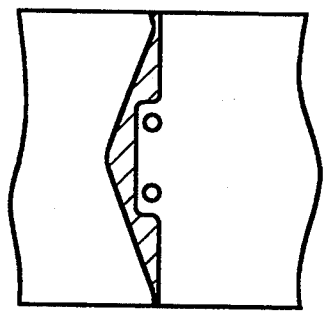
FIG. 2a and FIG. 2b are plan views showing the comparison between the present invention and the conventional example.

The shape of the leading edge portion of the film is not specifically limited as long as the central portion of the film is formed into a cut-out shape with respect to both side portions. However, since the opposite end with respect to the cut-out portion is a base end which is fixed to a spool shaft of the cartridge 7, it is preferable that the film has a shape by which the base end of the film can be easily fixed and the loss of a film can be reduced in the production process. As shown in the example, when the central portion is cut out, a fitting portion, by which a base end portion of the next film is fixed to the spool shaft, can be provided in the central cut-out portion of the leading edge portion of the film as shown in FIG. 2(a). Accordingly, as shown by hatched lines in the drawing, film dust which is generated in a film cutting process at the production, can be greatly reduced.

Figure 2B:
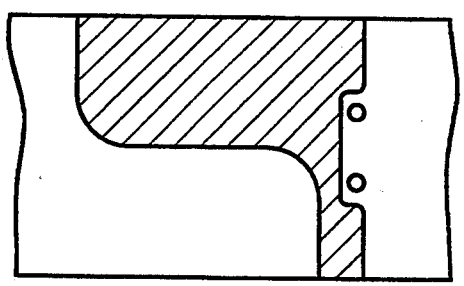

FIG. 2(b) shows the conventional 35 mm photographic roll film accommodated in the cartridge. In the conventional film, a large amount of film dust is generated in the film cutting process. As can be seen, the film shown in FIG. 2(a) is advantageous as compared with the foregoing conventional film.

Figure 3:
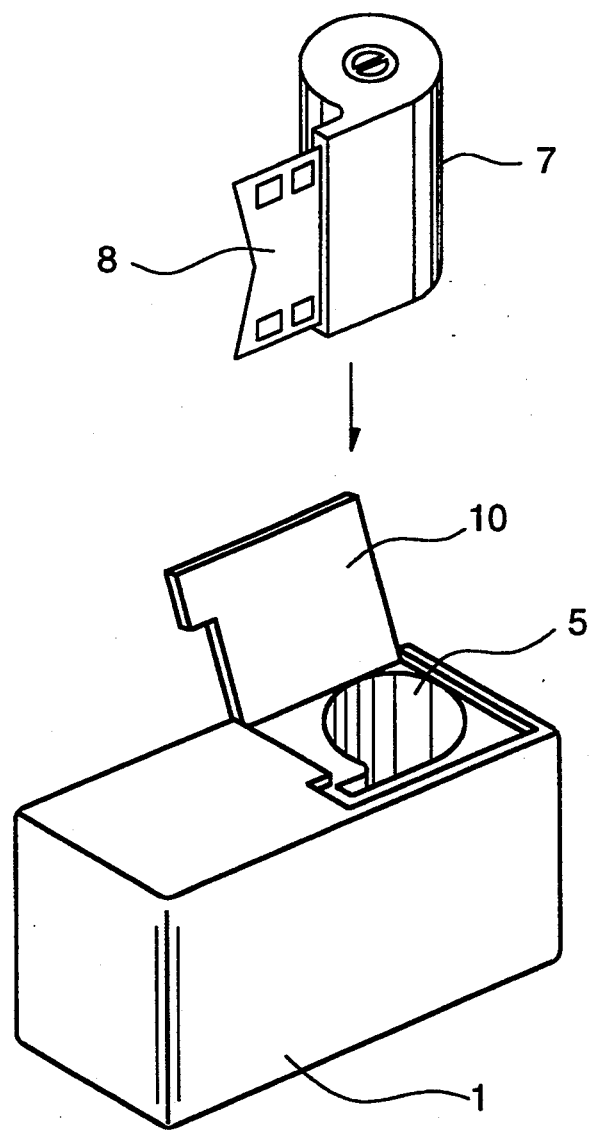
FIG. 3 is a perspective view showing the condition in which a film cassette is loaded in a camera.
Figure 4:
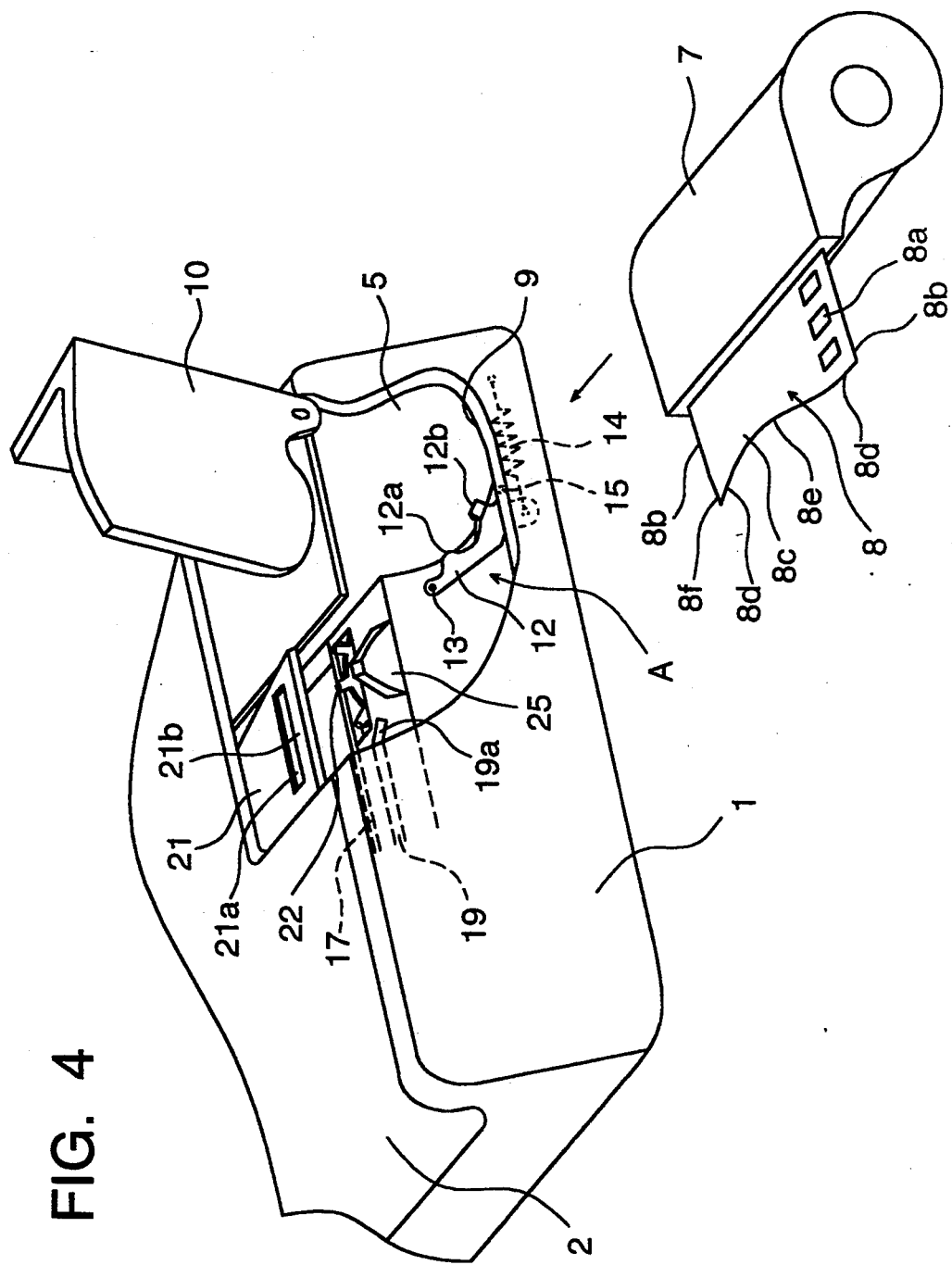
FIG. 4 is a perspective view showing the condition in which a cartridge is loaded in an easy-loading camera.
Figure 5:
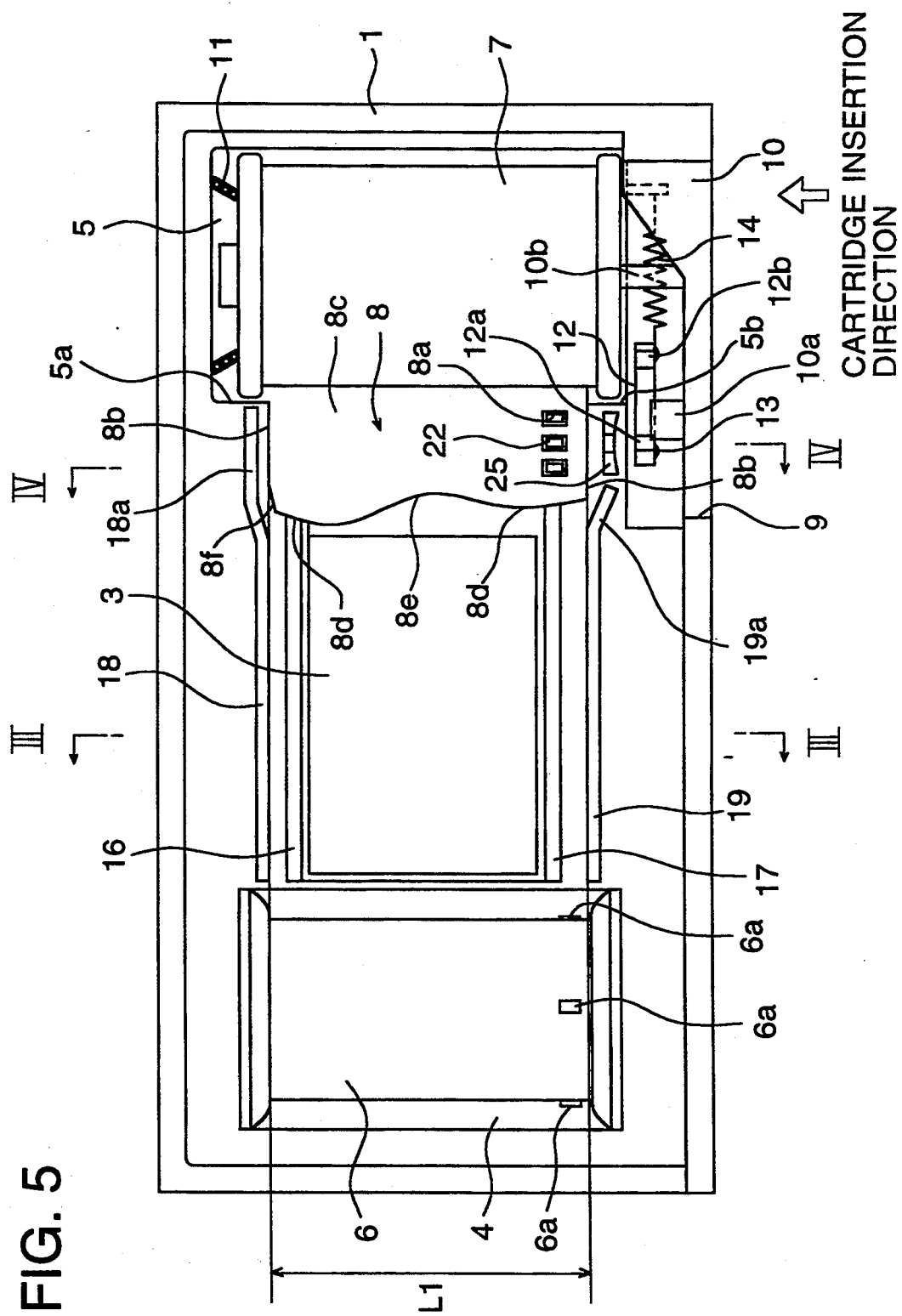
FIG. 5 is a plan view showing the condition in which the cartridge is loaded in the easy-loading camera.
Figure 6:
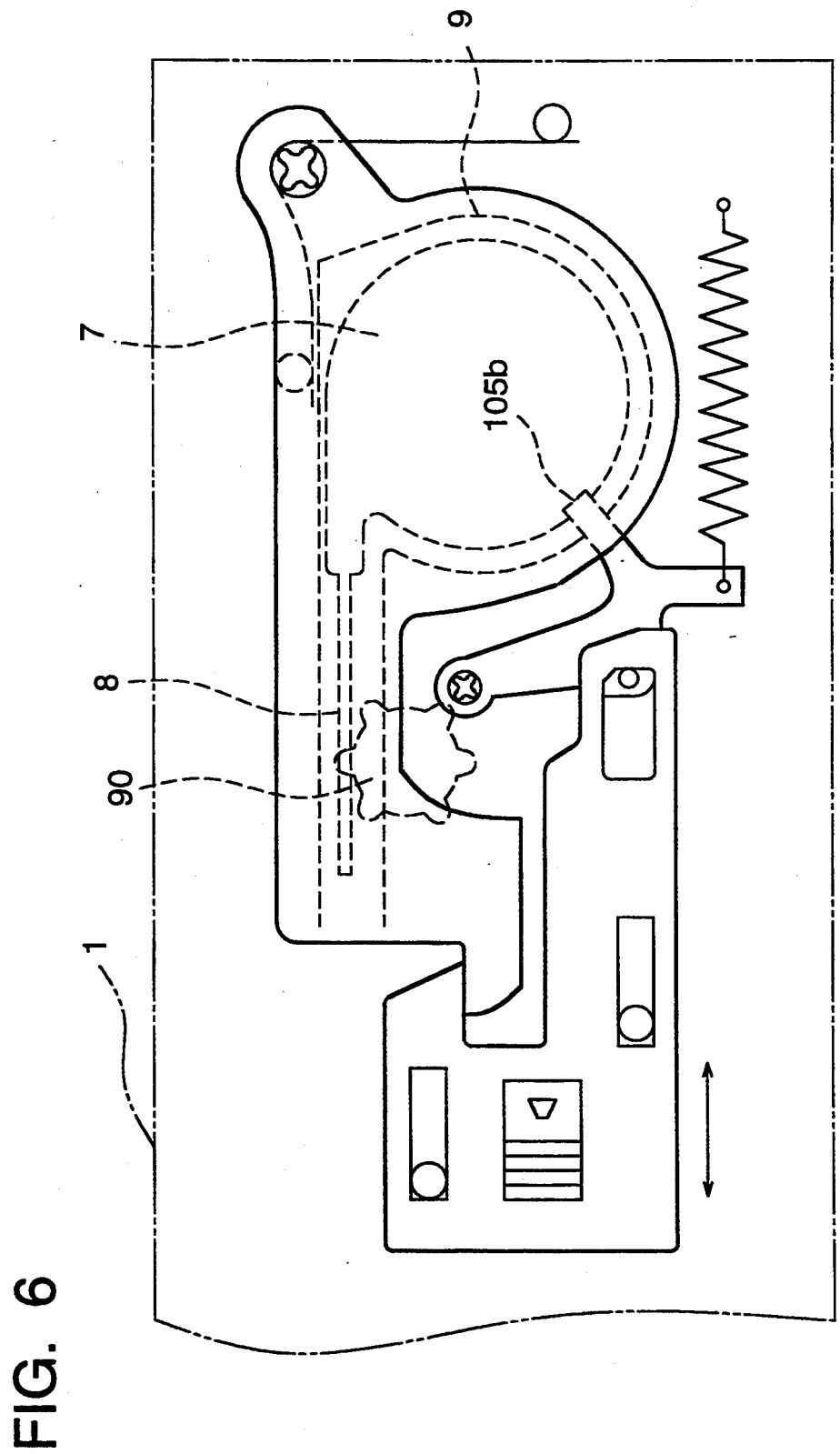
FIG. 6 is a view showing the condition in which the cartridge is loaded in the easy-loading camera.

Since the center of the film according to the present invention is cut out, perforations provided at both the sides of the film can be easily engaged with gears of the sprocket. Further, when the film passes through an end portion of a pressure plate (rear plate) of the exposure section of the camera, both the side portions of the leading edge of the film pass through the end portion at first, and then portions close to the center of the leading edge portion of the film successively pass, and finally, the central portion of the film passes. Accordingly, even when the film is curled in the lateral direction, curling is corrected as the film is moved, and the leading edge of the film is not caught by the pressure plate of the camera, so that the film can be smoothly loaded in the camera. Further, even when the film is curled in the longitudinal direction, since the leading edge portion has the same width as that of the film, the leading edge portion is not dropped in an exposure frame portion when the film is conveyed. Cameras in which the photographic film cassette according to the present invention is loaded, are shown, for example, in FIG. 3 and FIG. 4. FIG. 5 is a plan view showing the condition under which the photographic film cassette is loaded. FIG. 6 is a sectional view showing the condition under which the photographic film cassette is loaded.

A rear cover 2 is provided to a camera body 1 of the easy loading camera in the manner that the rear cover can be opened and closed as shown in FIG. 5. A take-up reel chamber 4 is formed at one of the left side and right side of an exposure frame 3 of the camera body 1, and a film chamber 5 is provided at the other side of the exposure frame 3. A take-up reel 6 is rotatably provided in the take-up reel chamber 4. An engagement claw 6a of the take-up reel 6 is engaged with perforations 8a of a film 8 in a cartridge 7 so that the film 8 is wound up. A cartridge insertion opening 9 is provided in a portion opposite to the film chamber of the camera body 1 in the manner that the film insertion opening 9 can be opened and closed by a cartridge cover 10. An ejection spring 11 by which the cartridge 7 is urged to be ejected is provided at the innermost portion of the film chamber 5. Accordingly, the cartridge 7 is always urged to be taken out by the ejection spring 11, and when the cartridge cover 10 is closed, the cartridge 7 is contacted with a rib 10b with pressure, which is formed inside the cartridge cover 10.

Figure 7:
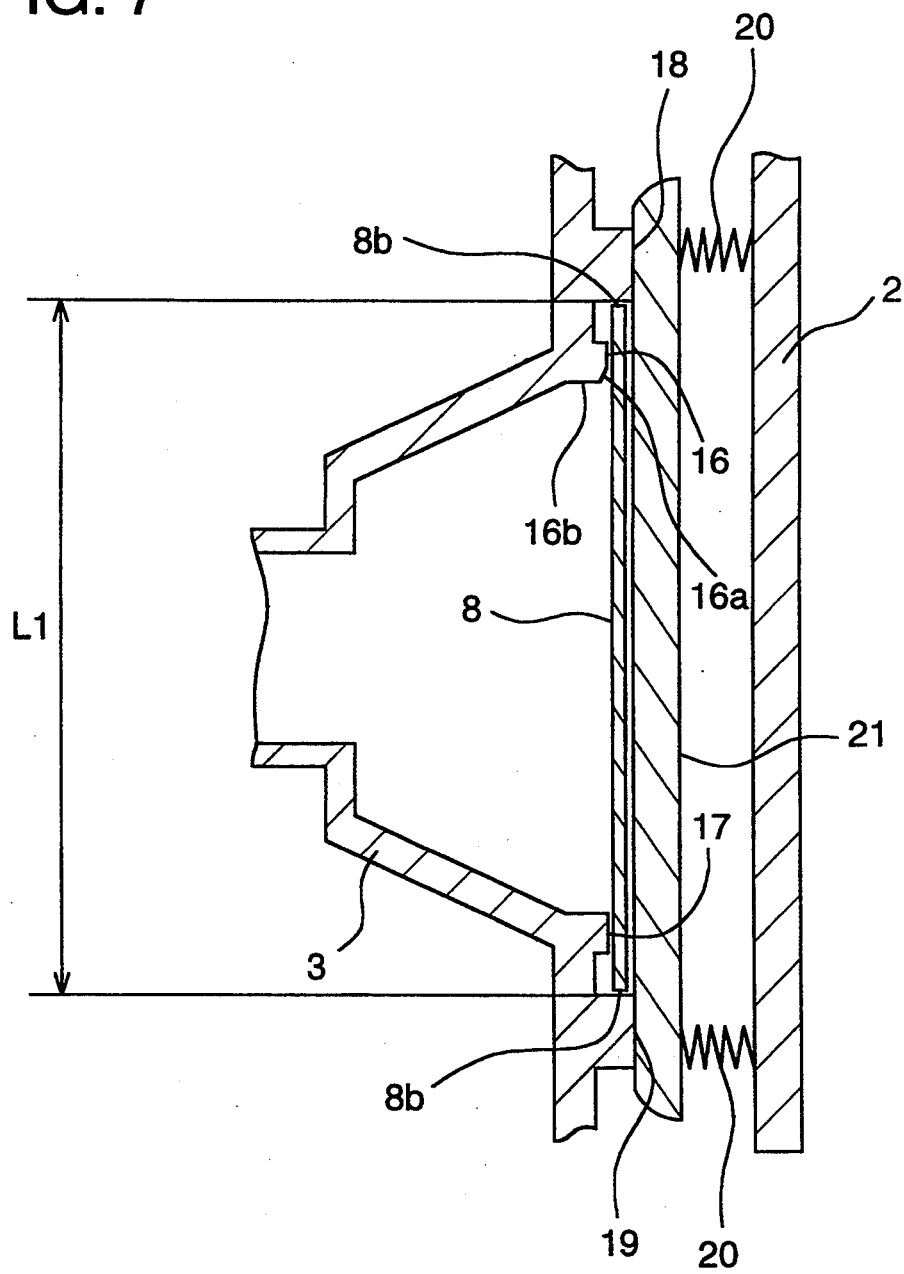
FIG. 7 is a sectional view taken on line III—III of FIG. 5.
Figure 8:
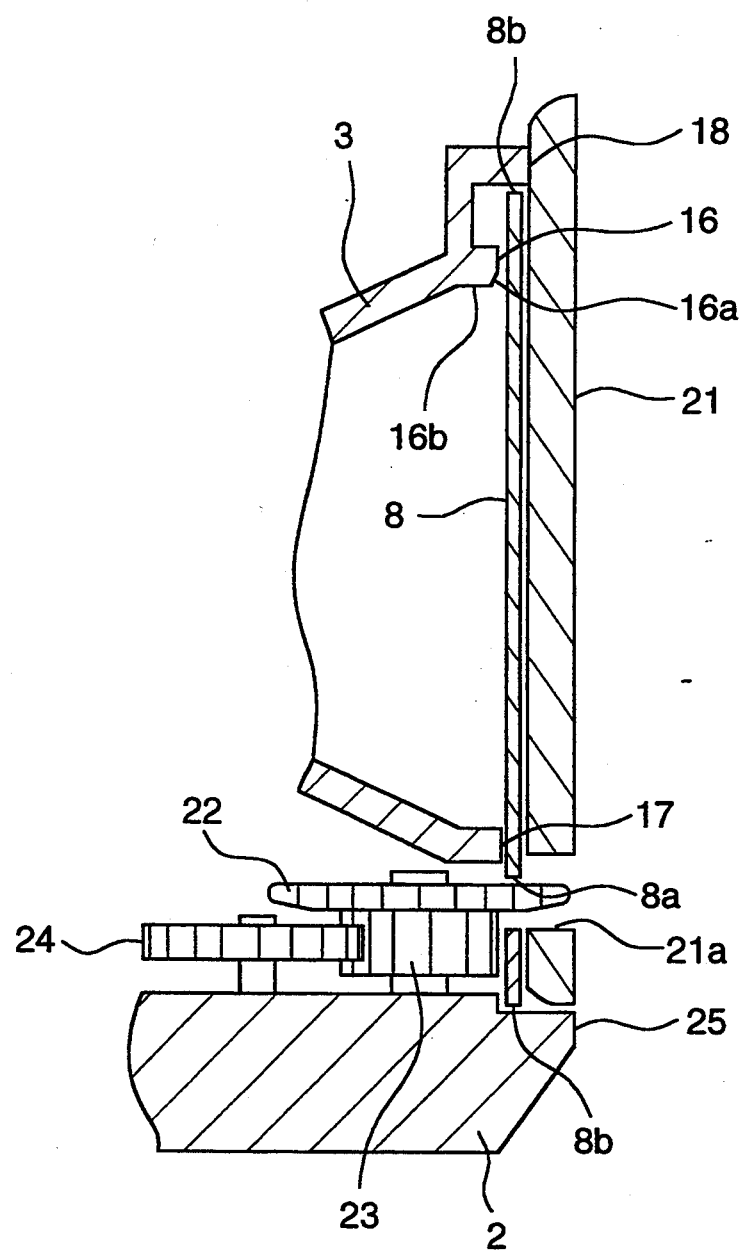
FIG. 8 is a sectional view taken on line IV—IV of FIG. 5.

FIG. 7 is a sectional view taken on line III—III in FIG. 5. FIG. 8 is a sectional view taken on line IV—IV in FIG. 5.

A pair of inner guide rails 16 and 17, and a pair of outer guide rails 18 and 19 are formed outside the exposure frame 3 in the vertical direction. The length between the outer guide rails 18 and 19 is equal to the film width L1. In FIG. 7, each surface of a pair of outer guide rails 18 and 19 is positioned slightly higher than that of a pair of inner guide rails 16 and 17. A pressure plate 21 which is held by the rear cover 2 through a spring 20, is contacted with the pair of outer guide rails 18 and 19 with pressure. Due to the foregoing, the film 8 is conveyed between the inner guide rails 16, 17 and the pressure plate 21, and both the side end portions 8b of the film 8 are guided by the outer guide rails 18 and 19 and conveyed. At this time, since the shape of the leading edge of the film is formed in the manner that both the side end portion are protruded with respect to the central portion, the film is not curled in the lateral direction, so that the film can be conveyed without any trouble.

Taper portions 18a and 19a are respectively formed at end portions of outer guide rails 18 and 19 beside the film chamber. The shape of the taper portions is formed as follows. The distance between both the ends of the tapered portions is larger than the film width L1: and it is equal to the film width L1 as the tapered portions approach the exposure frame 3 from the end portions of the film chamber 5a and 5b. In this example, although taper portions 18a and 19a are formed on both the outer guide rails 18 and 19, only the tapered portion 19a may be formed on the outer guide rail 19.

A sprocket 22 is provided near the end portion of the inner guide rail 17 beside the film chamber, and the sprocket 22 is engaged with perforations 8a. A gear 23 is coaxially formed with the sprocket 22, and meshed with a driving gear 24. When the driving gear 24 is driven, the sprocket 22 is rotated through the gear 23, and the film 8 is supplied. Taper-shaped protrusions 25 are formed outside the sprocket 22. As shown in FIG. 5, when the protrusions 25 push the cartridge 7 in the shaft direction and the cartridge is loaded in the film chamber 5, it is intended that the leading edge portion 8c of the film 8 is not caught by the sprocket 22. A clearance window 21a is formed at the portion opposite to the sprocket 22 on the pressure plate 21. Further, the pressure plate 21 is structured as follows. When the cartridge 7 is loaded in the film chamber 5, an end portion 21b of the pressure plate 21 is relieved in the film loading direction so that the leading edge portion 8c of the film 8 is not caught by the end portion 21b of the pressure plate 21.

Figure 10:
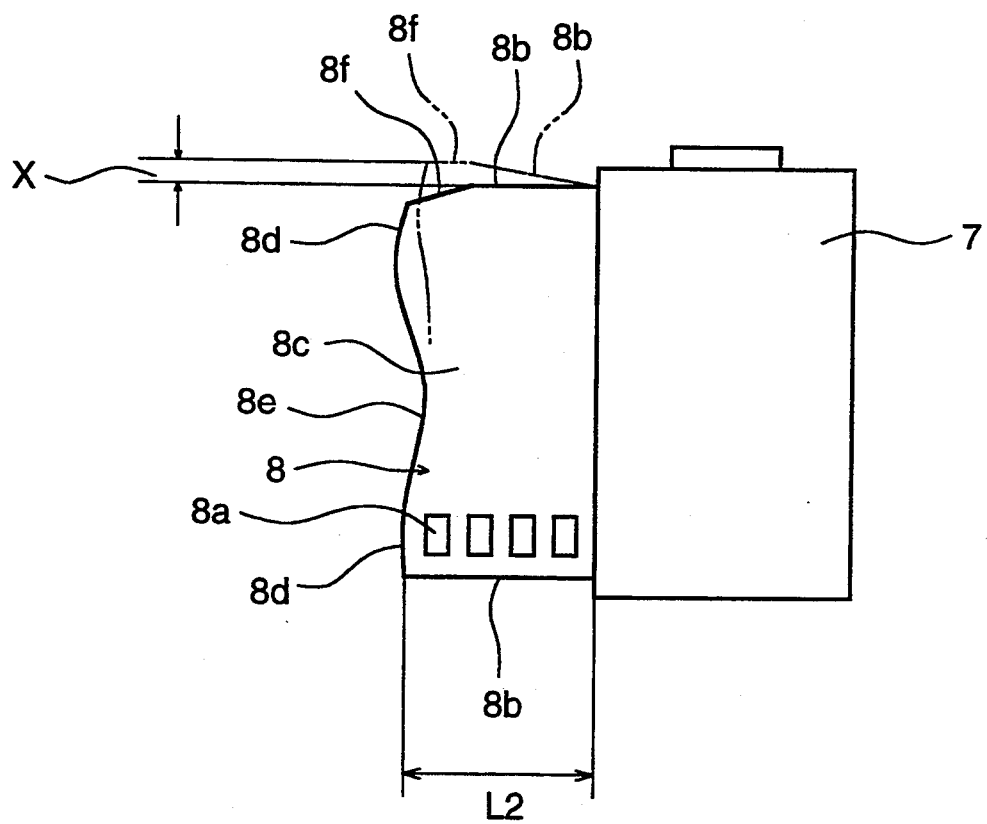
FIG. 10 is a side view of the cartridge.

A core-set of the film 8, that is, so-called curl, is generated more or less in the production process. Due to the foregoing, when the cartridge 7 is loaded in the film chamber 5, there is no problem in the case where the leading edge portion 8c of the film 8 does not reach to the exposure frame 3. However, when the leading edge portion 8c is drawn out from the cartridge 7 in the degree that it reaches to the exposure frame 3, the following problems are caused. The leading edge portion 8c of the film is dropped in the exposure frame 3 due to the curl of the film at the time of film loading; and side end portions 8b of the film are blocked by the end surface of the exposure frame 3, that is, the side end surface 16b of the inner guide rail 16, so that insufficient film loading is carried out. In order to solve the foregoing problems, the following is provided. A taper 8f, in which the width of the film is narrow at a leading edge side of the film and is equal to the film width as the taper approaches the cartridge side, is provided on the side end 8b of the leading edge portion 8c of the film. Further, a taper 16a, in which the height of the inner guide rail 16 is lower at the side end surface 16b side of the inner guide rail 16 and is higher as the taper is apart from the exposure frame 3, is provided on the inner guide rail 16 of the camera body 1. As shown in FIG. 10, the taper 8f of the film is provided in the opposite side to perforations 8a. However, the taper 8f may be provided on the perforation side corresponding to the position of the film chamber 5 or the loading direction of the cartridge 7. Of course, it is most appropriate that the taper 8f is provided on both the sides of the end portion of the film. As described above, the taper is provided to both the film 8 and the camera body 1. Accordingly, even when the leading edge portion 8c of the film is dropped in the exposure frame 3 due to the curl of the film, the leading edge portion 8c of the film is pushed out to the guide rail side by the action of the tapers 8f and 16a, moved onto the inner guide rail 16, and accurately positioned. The foregoing effects can be fully obtained not only by both of the taper 8f of the film side and the taper 16a of the camera side, but also by either one of them. Of course, it is more effective to provide both of the tapers.

Accordingly, when the cartridge cover 10 is opened, the cartridge 7 is pushed to the direction of the shaft and loaded in the film chamber 5 from the cartridge insertion opening 9, and the sprocket 22 is rotated and the film is automatically loaded, both the side end portions 8b of the leading edge portion 8c of the film 8 are guided by taper portions 18a and 19a of the outer guide rails 18 and 19 and sent to the exposure frame 3, and the film 8 can be accurately set to the exposure frame 3.

Figure 9:
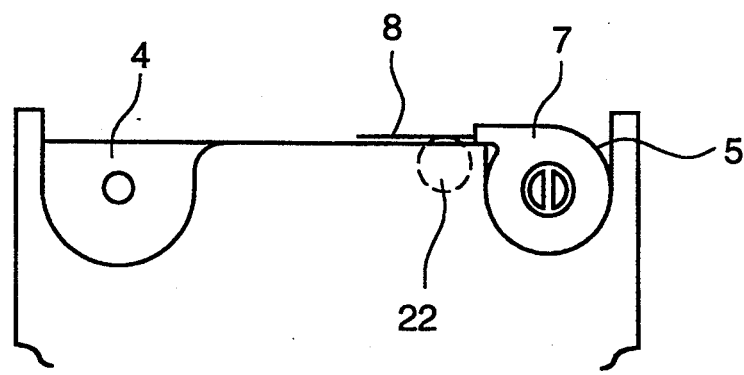
FIG. 9 is a view showing the outline of a film conveyance in the camera.

FIG. 9 shows a film winding mechanism of the camera. In the drawing, numeral 22 is a sprocket. The sprocket 22 is engaged with perforations of the film of the film cassette which is inserted into the film chamber 5, and conveys the film to the film take-up chamber 4.

The sprocket 22 is positioned close to the film chamber 5, and can engage with perforations formed on leading edge portion of the film drawn out from the film cassette.

When perforations of the film are provided at 4.75 mm pitch, it is preferable that the number of teeth of the gear of the sprocket 22 is large so that the film is securely conveyed. However, when the number of teeth is large, the diameter of the sprocket becomes large, so that the size of the camera becomes large. Due to the foregoing, it is preferable that the number of teeth is six to eight.

As described above, the length of the leading edge portion drawn out from the cartridge 7 is preferably 10 to 25 mm, and more preferably 10 to 21 mm. When the cartridge 7 is set in the camera, the foregoing length is appropriate to engage the leading edge of the film 8 with the gear of the sprocket for automatic loading. It is preferable for the film to have the length in which at least two perforations are provided in the leading edge portion of the film drawn out from the slit of the cartridge so that the film is sufficiently engaged with the sprocket.

It is sufficient for the leading edge portion of the film of this invention to have at least two perforations on at least one side in order to engage with the sprocket.

In the case where the length is shorter than 10 mm, the sprocket of the camera is incompletely engaged with perforations formed on the leading edge portion of the film when the film cassette is loaded in the camera, so that incomplete film winding is apt to be caused.

When the length exceeds 25 mm, the leading edge of the film is caught by the opening of the camera due to curling in the longitudinal direction of the film, and it is difficult to load the film cassette in the camera, which is disadvantageous.

Further, when an area of the leading edge of the film drawn from the cartridge 7 is set to 350 to 900 mm$^2$, an exposed portion, which is unnecessary for the film, can be greatly reduced as compared with the roll film in the current 35 mm cartridge, the loss of the film can be eliminated, and at the same time, an unexposed film longer than the conventional film can be accommodated in the cartridge.

Further, when the camera is structured in the manner that the leading edge portion of the film is rolled into the cartridge by the camera after photographing has been completed, it can be easily discriminated whether the film cassette has been used.

As described in the example, perforations may be provided on both the sides of the film, or the perforations may be provided on only one side of the film. Further, perforations may be provided only in the portion having the length necessary to convey the leading edge portion of the film to the take-up reel chamber 92 and securely wind it round the take-up reel, (for example, about 80 mm from the leading edge of the film).

When the film is structured so that perforations are provided on only one side of the film, or perforations are provided on only the leading edge portion of the film, an information recording area of the film by an optical means or a magnetic means can be increased.

Further, perforations may not be formed on the film; and a driving roller made of high frictional material such as silicone rubber, may be provided instead of the sprocket of the camera so that the film is sent by the roller.

According to the present invention, the film cassette can be easily loaded in the camera, and sure film loading can be performed. Further, even in the case where magnetic material is coated on the film, and thereby curling in the longitudinal direction or in the lateral direction of the film is heavy, no film winding trouble is caused by film curling when the film is loaded in the camera, especially in an automatic loading type camera, and an initial winding operation is carried out, which is advantageous. Further, since the central portion of the leading edge portion of the film is cut out with respect to both the sides of the film, an ineffective film portion can be saved as compared with the conventional shape of the long leading edge portion, so that the film of the present invention can be greatly effective on resource saving.

What is claimed is:

1. A photographic roll film package, comprising:

a roll film having a leading edge portion; and a cartridge in which the roll film is stored in an initial packaged condition before being used for photographing, the cartridge having a slit through which the roll film is pulled out of the cartridge so as to be usable for photographing; and wherein:

the leading edge portion of the roll film protrudes out of the cartridge, by a length of 10 mm to 25 mm in a direction in which the leading edge portion of the roll film is pulled out of the cartridge in the initial packaged condition thereof; and two side edge portions of the leading edge portion of the roll film protrude out of the cartridge more in said direction than a center edge portion of the leading edge portion of the roll film.

2. The film package of claim 1, wherein an area of the leading edge portion is 350 mm$^2$ to 900 mm$^2$.

3. The film package of claim 1, wherein a magnetic recording layer is provided on the roll film.

4. The film package of claim 1, wherein at least one perforation is provided on at least one of the two side edge portions of the roll film.

5. The film package of claim 4, wherein at least two perforations are provided on at least one of the two side edge portions of the leading edge portion of the roll film.

6. The film package of claim 1, wherein one side edge portion of the leading edge portion is tapered.

7. The film package of claim 1, wherein a width of the roll film is 35 mm.

8. The film package of claim 1, wherein the leading edge portion of the roll film has a width equal to a width of a remaining portion of the roll film, remaining after the leading edge portion.

* * * * *